United States Patent [19]
Brun et al.

[11] 3,834,546
[45] Sept. 10, 1974

[54] SEMI-PERMEABLE TUBULAR ASSEMBLY

[75] Inventors: Robert Brun, Vaucluse; Michel Pages, Ardeche, both of France

[73] Assignee: Rhone-Poulenc S.A., Paris, France

[22] Filed: May 4, 1973

[21] Appl. No.: 357,227

[30] Foreign Application Priority Data
May 5, 1972   France .............................. 72.16107

[52] U.S. Cl. ................... 210/321, 210/433, 210/490
[51] Int. Cl. ........................................... B01d 31/00
[58] Field of Search .......... 210/490, 491, 433, 520, 210/22, 23, 321

[56] References Cited
UNITED STATES PATENTS

| | | | |
|---|---|---|---|
| 1,057,823 | 4/1913 | Grenet | 210/500 X |
| 1,720,670 | 7/1929 | DuClaux | 210/500 X |
| 3,442,389 | 5/1969 | Mendelson | 210/491 X |
| 3,494,465 | 2/1970 | Hyrop | 210/490 X |
| 3,563,889 | 2/1971 | Cooper et al. | 210/490 X |
| 3,712,473 | 1/1973 | Ellenberg | 210/433 X |
| 3,762,566 | 10/1973 | Pico | 210/490 |

Primary Examiner—Frank A. Spear, Jr.
Attorney, Agent, or Firm—Stevens, Davis, Miller & Mosher

[57] ABSTRACT

A flexible semi-permeable membrane, for fluid separation apparatus, for reverse osmosis, ultra-filtration or gas separation, including a cord comprising a plurality of longitudinally extending yarns forming a core and a knitted woven or braided textile sheath surrounding the core. A semi-permeable membrane surrounds the cord, the core of which communicates with the exterior near at least one of its ends. In the manufacture of the assembly the cord is passed through a heated cylindro-conical tube to calibrate and smooth the sheath and is impregnated with water. The cord is then coated with a collodion the solvent of which is evaporated to form the semi-permeable membrane and the water is at least partly removed.

8 Claims, 1 Drawing Figure

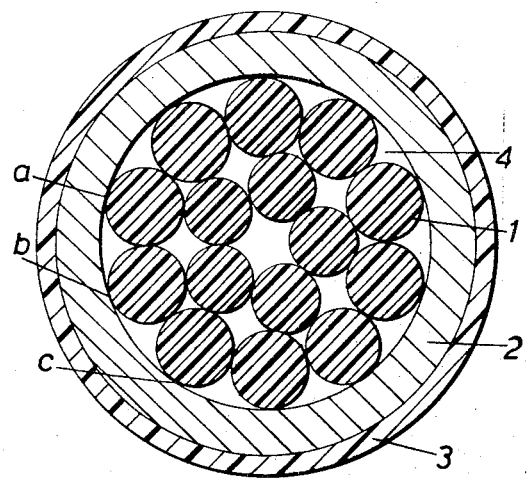

SEMI-PERMEABLE TUBULAR ASSEMBLY

The present invention relates to semi-permeable tubular assemblies which can be used especially for separating fluids by reverse osmosis, ultrafiltration or gas permeation.

It is known to produce semi-permeable tubular assemblies by casting a collodion directly onto a rigid tubular support which is porous or possesses perforations. According to French Pat. No. 1,395,552, a porous tube made of glass fibre is used as the support, and according to U.S. Pat. No. 3,446,359, a solid tube possessing spaced perforations covered with a porous component such as a woven fabric or a paper is used as the support. Such semi-permeable assemblies can be grouped in parallel bundles in a fluid-separating apparatus. The manufacture of assemblies of this type involves a series of operations which can be difficult to carry out automatically and continuously. Because of this, and despite the improvements introduced hitherto, the manufacture of such assemblies is not sufficiently economical.

It has also been proposed, in the French Pat. No. 2,075,524, to form a tubular membrane continuously on a solid grooved thin tube, covered with a textile braid, the components thus produced being also joined to form a fluid-separating apparatus; however, since the supports are rigid or semi-rigid, these components can, in practice, be arranged only in parallel bundles.

According to the present invention there is provided a flexible semi-permeable tubular assembly for use in fluid separation apparatus, for example for reverse osmosis, ultra-filtration or gas separation, such assembly including a cord comprising a plurality of longitudinally extending yarns forming a core and a textile sheath surrounding said core and a semi-permeable membrane surrounding said cord, communication being provided between the core of the cord and the exterior.

Such an assembly can be employed in various shapes, which enable high pressures to be used and provide a large surface area for a small volume, thus especially to improve the hydrodynamic conditions of fluid flow and thus the yield of the apparatus.

The present invention also provides a method of making such as assembly, such method comprising forming a core of at least two yarns, applying a textile sheath around said core to form a cord, passing said cord through a cylindro-conical tube heated to a sufficient termperature to cause the surface of the sheath to soften, to calibrate and smooth the cord, impregnating said sheath with a compound, coating the cord with a collodion, said compound being immiscible with said collodion, and not affecting said textile sheath, evaporating the solvent from the collodion, to form a semi-permeable tubular membrane surrounding the sheath and at least partially removing the compound.

In order that the invention will be better understood the following description is given, merely by way of example, reference being made to the accompanying drawing in which the sole FIGURE is a schematic cross section through one embodiment of assembly according to the invention.

The assembly illustrated includes a bundle of yarns 1 grouped against one another, which form the core of the cord. The bundle of yarns is surrounded by a textile sheath 2 to which a semi-permeable membrane 3 is applied.

When the component thus formed is placed in a fluid under pressure, comprising at least two constituents A and B, such that the constituent A diffuses through the membrane 3 more rapidly than the constituent B, the constituent A passes through the membrane 3 and then reaches the passages 4 formed by the spaces between the sheath 2 and the yarns 1 or by the spaces between the yarns 1. The constituent A flows along the passages 4 to a region where the core of the cord communicates freely with the outside, situated, for example, at one end of the cord.

The yarns 1 can be single-strand or multi-strand filaments. The number of yarns 1 is at least equal to two and there can be as many as several tens and even several hundreds. The yarns are arranged longitudinally; they can extend either parallel to one another or advantageously be twisted, stranded or braided together, in twos or threes or in any number whatsoever and especially all together. If desired, the yarns 1 can be grouped in sheathed elementary bundles which are collected together inside a common sheath. The cross-section of the yarns can be circular, ellipical or prismatic. The yarns can be of the same diameter or of different diameters; advantageously, the yarns are cylindrical and have a diameter of between 0.1 and 3 mm, and preferably between 0.15 and 1.5 mm. As the material of which the yarns are made, it is possible to use glass, metals or metal alloys which preferably cannot be oxidised under the use conditions. Natural, artificial or preferably synthetic textile yarns are advantageously used.

The textile sheath 2 can consist of a filament wound in a helix around the bundle of yarns 1. It can also consist of a woven fabric rolled around the bundle of yarns 1. The sheath preferably consists of a knitted, woven or braided textile sleeve which grips the bundle of yarns 1 tightly. If desired, it can consist of several superposed textile webs. The textile sheath can have a circular, elliptical or prismatic cross-section. A sheath with a circular cross-section, of external diameter between 1 and 8 mm and preferably between 2 and 5 mm, is generally very suitable, because it provides a relatively large surface area of membrane for a particular volume of the separating apparatus. As the material, it is possible to use natural, artificial or synthetic textiles; however, it is preferred to use synthetic textiles such as polyamides, polyesters, polyolefines and the like. The same material can optionally be used for the yarns 1 and the sheath 2.

The passages 4 extend longitudinally, their cross-section and their profile depending essentially on the shape and on the arrangement of the yarns 1. They can thus especially be parallel or coiled. It is apparent in the figure that the peripheral channels, situated between the sheath 2 and two or more yarns 1, are practically adjoining. Thus the portion of textile sheath between the points of contact a and b is adjacent to a first channel and the portion of textile sheath between the points of contact b and c is adjacent to a second channel. In all, it is the whole of the internal surface of the textile sheath which is in contact with the peripheral channels, with the exception of a few thin regions of contact between the yarns and the sheath. This arrangement very substantially assists the removal of the fluid which has passed through the membrane. This removal can be further improved if communications between the peripheral channels and the internal channels situated between yarns are facilitated, for example, either by stranding the yarns together, which permits periodic interchange of the peripheral channels with the internal channels and vice versa, or by marking the yarns 1 with transverse grooves.

It is simple and economical to manufacture a tubular membrane support component consisting of a flexible cord. Quite simply, a usual design of a cord can be used as the starting material and be subjected to a few simple operations. For example, starting with a cord of which the sheath is made of a heat-shrinkable textile, the cord is passed through a chamber heated to a temperature which causes the sheath to shrink and tighten over the core of the cord which prevents possible pleats in the sheath. The external surface of the cord is then smoothed and calibrated by passing it at constant speed through a convergent cylindro-conical tube heated to a sufficient temperature to cause the surface of the textile sheath to soften. This smoothing obliterates all the fibres, strands or filaments which stick out beyond the cylindrical surface of the cord or causes them to disappear.

The porosity of the textile sheath is modified temporarily by impregnating the cord with a compound which is not miscible with collodion, which does not have any effect on the textile sheath and which can subsequently be removed at least partially. For example, the smoothed cord is immersed in water or in a liquid which is miscible with water in order momentarily to seal the interstices between the filaments of the sheath. A collodion is then spun over the sheath of the cord, working in accordance with known techniques, for example, those which are described in French Pat. Nos. 1,426,548 and 1,506,402; and finally a heat treatment, such as that described in U.S. Pat. No. 3,446,359, is carried out. The water, which was used momentarily to seal the interstices of the sheath and which thus prevented the collodion from penetrating to the inside of the sheath, now evaporates. A combination is thus produced in which the passage, through the sheath, of the fluid which has passed through the membrane is made easier, which improves the flow rate of this fluid.

It is easily appreciated that all these operations can be carried out automatically and continuously and under economically advantageous conditions. Of course, some of these operations can be separated.

The semi-permeable tubular assembly according to the invention can thus be manufactured continuously and in very large lengths. It then suffices to cut it into sections and to assemble the sections to form fluid-separating apparatuses. It is possible, for example, to assemble these sections in parallel bundles or to coil them and then to seal them in a leakproof manner near their ends, the latter opening freely beyond the leakproof region. In order to construct these fluid-separating apparatuses, it is of course possible to apply known techniques for constructing apparatuses possessing semi-permeable tubular components.

The membrane thus formed on a flexible cord can withstand high pressures, for example of the order of 60 bars, without detrimental deformation.

These semi-permeable tubular assemblies according to the invention can be used especially for the separation, purification or concentration of fluids, be they liquids or gases, in accordance with the techniques of reverse osmosis, ultrafiltration, gas permeation or pervaporation.

These assemblies can be the subject of numerous different embodiments, within the ability of a technician.

The following example, which is given without implying a limitation, illustrates an assembly according to the invention, its method of preparation and its use.

EXAMPLE

A flexible cord is used, the core of which consists of a parallel bundle of 52 single filament yarns of diameter eighteen one hundreds mm, made of polypropylene. The bundle is surrounded by a textile sheath made of polypropylene filaments woven with a satin-type weave with five strands caught up and two dropped. The warp is composed of 86 multi-filament yarns of 200 deniers, doubled with 340 turns to the metre. The weft is composed of multi-filament yarns of 200 deniers, doubled with 340 turns to the metre. It is produced by 20 pirn passes to the cm per face on both faces.

The cord is immersed for 5 minutes in a chamber containing water at a temperature of 85°C, which causes the sheath to shrink slightly around the bundle of fibres and produces a compact combination, suitable for withstanding high pressures without appreciable deformation. The smoothing and calibration of the cord are then carried out by drawing it through a convergent cylindro-conical tube heated to a temperature of 150°C, which causes the surface of the sheath to soften. This smoothing causes all the fibres, strands or filaments which stick out from the cylindrical surface of the cord to disappear and thus gives it a smooth external surface.

The cord is then immersed in a chamber filled with water at ambient temperature in order momentarily to seal the interstices between the filaments of the sheath, and then a collodion based on cellulose acetate is deposited on the cord, working in accordance with the techniques described in French Pat. Nos. 1,426,548 and 1,506,402. The assembly is kept at a temperature of 0°C for 30 minutes and is then heated to a temperature of 85°C for 20 minutes. The membrane thus formed on the cord has a substantially uniform thickness of between 0.18 and 0.20 mm; it adheres suitably to the support cord, even when it is bent into arcs of a circle of radius 100 mm.

The semi-permeable assembly thus produced is cut into a section of length 45 cm which is attached along the axis of a cylindrical chamber closed at its ends by two stoppers, the semi-permeable assembly passing through the stoppers into which it is sealed in a leakproof manner by means of epoxy resin. The cylindrical chamber is equipped with two side tubes which make it possible to set up a flow of raw water under pressure inside the chamber. Pure water, which has passed through the membrane by reverse osmosis, is collected at the ends of the semi-permeable component.

The results below were obtained, wherein Q denotes the rate of flow of pure water expressed in litres per day and per $m^2$ of membrane and the degree of rejection denotes, as a percentage, the ratio between the amount of salt held back by the membrane and the original amount of salt.

a. With a solution of sodium chloride of concentration 35 g/litre, at 20°C and under 60 bars.

$Q = 97 \text{ l/m}^2\text{/day}$, with a degree of rejection equal to 97.7%.

b. With a raw water of degree of harness = 32, at 20°C and under 60 bars.

$Q = 220 \text{ l/m}^2\text{/day}$, with a degree of rejection equal to 94.6%, based on calcium.

We claim:

1. In or for a fluid separation apparatus, for reverse osmosis, ultrafiltration or gas separation, a flexible semi-permeable tubular assembly including a cord comprising a plurality of longitudinally extending yarns forming a core and a textile sheath surrounding said core, a semi-permeable membrane surrounding said cord, and means providing communication between the core of said cord and the exterior.

2. A flexible semi-permeable tubular assembly as claimed in claim 1, wherein said means providing communication are located near at least one end of the cord.

3. A flexible semi-permeable tubular assembly as claimed in claim 1, wherein the yarns of which the core of said cord is composed are combined so as to be one of the group consisting of twisted, stranded and braided.

4. A flexible semi-permeable tubular assembly as claimed in claim 1, wherein the yarns of which the core of the cord are made have a circular cross-section of diameter between 0.1 and 3 mm.

5. A flexible semi-permeable tubular assembly as claimed in claim 1, wherein the core and the sheath of the cord are made of synthetic textile materials.

6. A flexible semi-permeable tubular assembly as claimed in claim 1, wherein the textile sheath is a sleeve formed by one of the group consisting of knitting, weaving or braiding.

7. A flexible semi-permeable tubular assembly as claimed in claim 1, wherein the textile sheath has a circular cross-section of external diameter of between 1 and 8 mm.

8. A method of making a flexible semi-permeable tubular assembly, for fluid separation apparatus, for reverse osmosis, ultrafiltration of gas separation, said method comprising the steps of forming a core of at least two yarns, applying a textile sheath around said core to form a cord, passing said cord through a cylindro-conical tube heated to a sufficient temperature to cause the surface of the sheath to soften, thereby to calibrate and smooth the cord, impregnating said sheath with a compound, coating the cord with a collodion, said compound being immiscible with said collodion, and not affecting said textile sheath, evaporating the solvent from the collodion, to form a semi-permeable tubular membrane surrounding the sheath and at least partially removing the compound.

* * * * *